United States Statutory Invention Registration [19]

[11] Reg. Number: H905

Rottenberg

[43] Published: Apr. 2, 1991

[54] FIN ASSEMBLY

[75] Inventor: Mark M. Rottenberg, Baltimore, Md.

[73] Assignee: The United States of America as represented by the Secretary of the Army, Washington, D.C.

[21] Appl. No.: 582,733

[22] Filed: Sep. 13, 1990

[51] Int. Cl.[5] ..... F42B 10/14

[52] U.S. Cl. ..... 244/3.28

*Primary Examiner*—Harold J. Tudor

*Attorney, Agent, or Firm*—Anthony T. Lane; Edward Goldberg; Edward F. Costigan

[57] ABSTRACT

A fin assembly is adapted for rear mounting on a projectile. The assembly has a body with a longitudinal axis and a front adapted for mounting to the projectile. A plurality of angularly spaced fins are pivotally mounted on the body for rotating outwardly from an axial to an extended position. Each of these fins has a pivot point and a center of gravity. The center of gravity for each fin in the axial position is spaced radially inward from the pivot point. Slots formed within the projectile body aid in retaining the fins in their axial position.

3 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 4
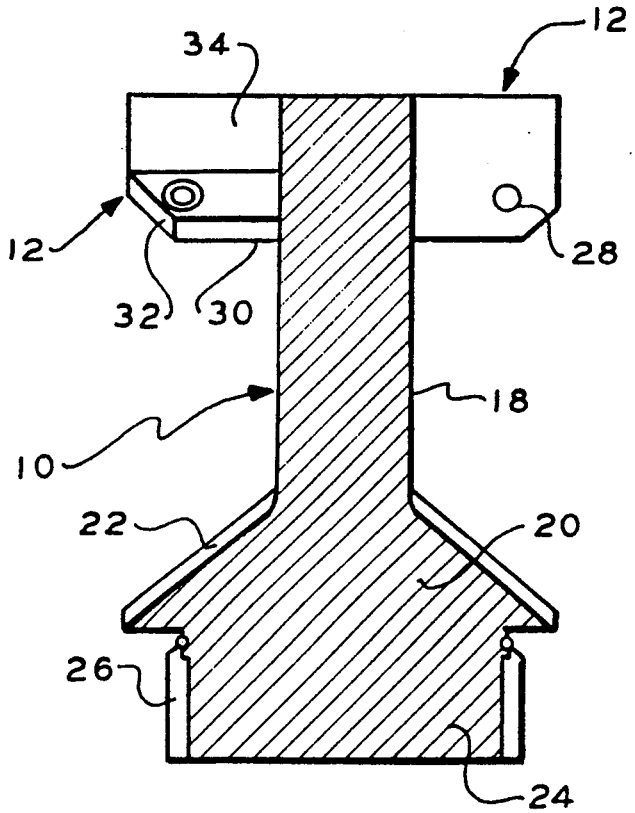
FIG. 7
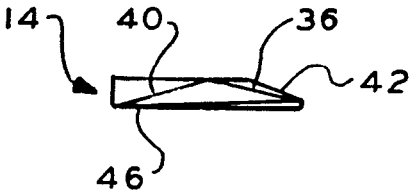
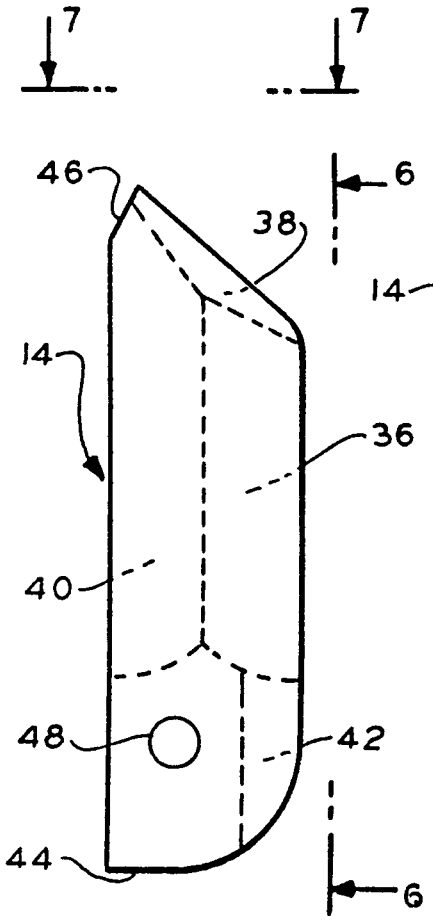
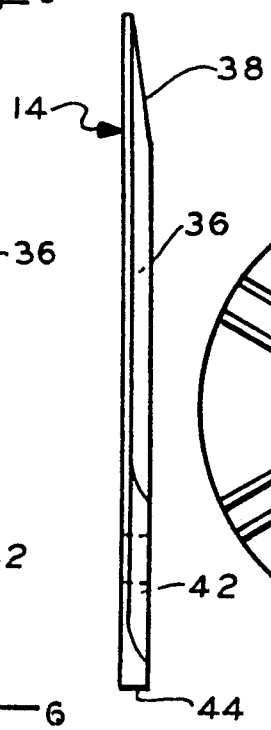
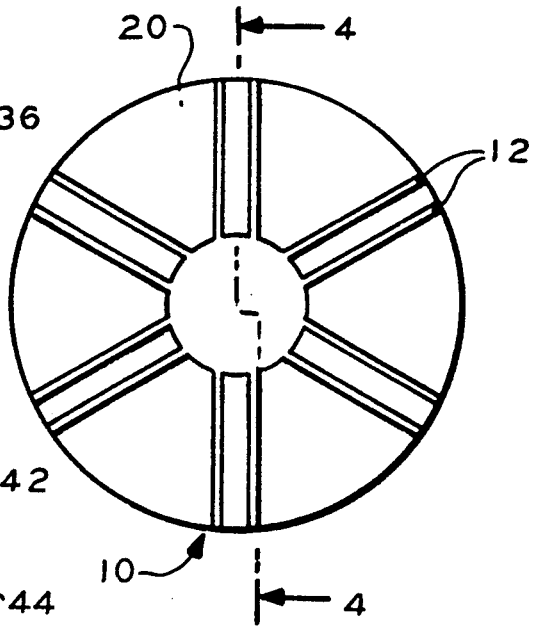
FIG. 5 FIG. 6 FIG. 3

FIN ASSEMBLY

GOVERNMENT INTEREST

The government has rights in this invention pursuant to Contract No. DAAK-10-78-C-0027 awarded by the Department of the Army.

BACKGROUND OF THE INVENTION

The present invention relates to fin assemblies and, in particular, to assemblies having a plurality of fins that rotate from a folded to an extended position during flight.

It is desirable to stabilize a projectile that is fired from a gun tube. One known technique for projectile stabilization is to provide rifling on the inside of the gun tube to impart a spin to the projectile as it is launched through the gun tube. Other known projectiles have included fins that stabilize the projectile by either preventing yaw aerodynamically or by also imparting a spin to the projectile. Such spin ameliorates any deviations from axisymmetrical weight distribution. By rotating the projectile at an appropriate speed, these weight imbalances can be compensated.

A risk when including moving parts on a gun-fired projectile is the danger that these moving parts will be damaged by the extreme forces applied during setback. These is the possibility that a moving part will either move prematurely or its joints will be damaged during setback.

Accordingly, there is a need for an improved fin assembly for stabilizing a projectile without running the risk of damaging moving parts.

SUMMARY OF THE INVENTION

In accordance with the illustrative embodiments demonstrating features and advantages of the present invention, there is provided a fin assembly adapted for rear mounting on a projectile. The assembly includes a body having a longitudinal axis. The body has a front adapted for mounting to the projectile. The assembly includes a plurality of angularly spaced fins, pivotally mounted on the body for rotating outwardly from an axial to an extended position. Each of the fins has a pivot point and a center of gravity. The center of gravity for each fin in the axial position, is spaced radially inward from the pivot point, and the fin hub of the body has fin retention grooves or slots formed therein for lateral stabilization of the fins in their initial vented positions. The fin retention grooves or slots assure that the fins are not twisted, dislodged or subjected to excessive force during firing.

The fins are mounted in such a way that their center of gravity is radially inward from their pivot points when folded. Thus during setback, axial forces tend to drive the fins inwardly. Thus the fins are kept cradled in their supporting slot and do not tend to deploy prematurely. Of course, premature deployment could cause a fin to extend and bear against the gun tube. Thus premature extension would result in excessive forces that would likely damage the fin.

The preferred fins are bevelled on one side of their leading edges to spin the projectile in a predetermined direction. The outer part of the leading and trailing edges are swept to provide appropriate aerodynamics characteristics and also to assure an appropriate fit inside the body slots.

In the preferred embodiment each fin is pivoted between a pair of parallel tabs. The fin can be mounted by a screw and bushing or other appropriate means to provide a rigid and reliable mount.

BRIEF DESCRIPTION OF THE DRAWINGS

The above brief description as well as other objects, features and advantages of the present invention will be more fully appreciated by reference to the following detailed description of presently preferred, but nonetheless illustrative embodiments in accordance with the present invention when taken in conjunction with the accompanying drawings, wherein:

FIG. 3 is an end view of the body of the fin assembly of FIG. 1;

FIG. 4 is an axially sectioned view along lines 4—4 of FIG. 3;

FIG. 5 is a side view of one of the fins of FIG. 1;

FIG. 6 is a side view along line 6—6 of FIG. 5;

FIG. 7 is an end view along lines 7—7 of FIG. 5; and

(FIG. 11 is believed to be in the prior art).

DETAILED DESCRIPTION OF THE PREFERRED EMBODIMENTS

Figure 1:
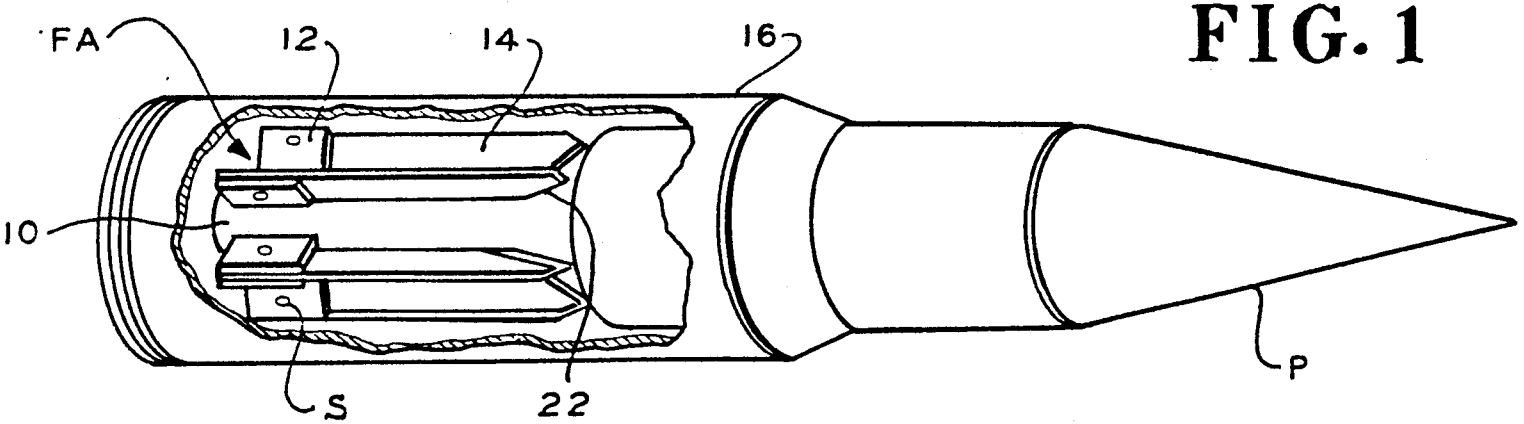
FIG. 1 is a perspective view of a fin assembly mounted on a projectile in accordance with the principles of the present invention.

Referring to FIG. 1, it shows a projectile P having mounted to its rear, fin assembly FA. Assembly FA includes a body 10 having projecting from its aft section a plurality of tabs 12. Tabs 12 are shown as a parallel pair of tabs. Mounted between each pair is one of a plurality of fins 14. Fins 14 are pivotally secured with screws S and bushing (not shown).

The combined projectile P and fin assembly FA is mounted into a cartridge case 16, which may be filled with a propellant (not shown). After the entire cartridge assembly of FIG. 1 is loaded into a gun tube, the propellant may be ignited to propel the projectile P and fin assembly FA in a well understood manner.

Referring to FIGS. 3 and 4, previously illustrated body 10 is shown having a fin hub including a midsection 18 integral with a flared front section 20. Front section 20 includes a generally frusto-conical portion having six slots 22, disposed equiangularly, that is, every 60 degrees. (See also slots 22 in FIG. 1.) Slots 22 are shown cutting only into the flared portion of front section 20, but in other embodiments the slot may continue into the midsection 18. Furthermore, in other embodiments, the front section 20 need not be slotted, but may include holders, clips or tabs of various types for embracing the fins in a folded position. The end 24 of section 20 is generally cylindrical with external threads for mounting body 10 onto the previously mentioned projectile.

Tabs 12 are shown arranged in six pairs equiangularly distributed every 60 degrees. Each tab 12 has a mounting hole 28 that acts as a pivot point. As explained hereinafter, hole 28 provides a pivot point that is at a position that is more radially remote than the center of gravity of a fin that is mounted on tab 12 and placed in a folded position. Each tab has on its outside face a leading bevel 30. An outer portion 32 of the leading bevel is shown swept back. The tab 12 also has a trailing bevel 34.

Referring to FIGS. 5, 6, and 7, fin 14 is shown with a leading edge with a bevelled middle portion 36. A bevelled distal portion 38 is shown swept back. A trailing edge 40 is also shown bevelled. In this embodiment, an inner portion 42 of the leading edge is also shown bevelled, but at a steeper angle. The outside portion 46 of the trailing edge 44 is shown swept forward to intercept the swept distal portion 38.

Hole 48 acts as a pivot point for fin 14. The inner end of fin 14 has a square butt 44 that is at right angles to the length of fin 14. The forward corner of butt 44 is rounded. Accordingly, fin 14 is free to rotate until it extends at approximately a right angle to the flight path, at which time butt 44 will engage the previously illustrated body to prevent further rotation.

To facilitate an understanding of the principles associated with the foregoing apparatus, its operation will now be briefly described. Before firing, body 10 is threaded onto projectile P with the fins 14 folded as shown in FIG. 1. Consequently, fins 14 have their leading swept portion 38 lodged in slots 22 (FIG. 4) to support them during setback. Cartridge case 16 is partially filled with propellant which surrounds fin assembly FA. The cartridge case 16 is sealed to the projectile P to form a readily transportable round.

This round can be loaded into a gun tube (not shown) and fired in a conventional manner. A fuze assembly (also not shown) can be mounted in the base of cartridge case 16 for this purpose. Upon ignition, the propellant is quickly consumed to cause extreme pressure that bears against the projectile P and fin assembly FA, driving them along the gun tube.

During setback rather high pressure is applied to all of the components of fin assembly FA. Also the consequentially high forward acceleration places significant stress on the screws S holding fin assembly FA together. This stress, however, is moderated by the fact that the swept leading edge 38 of each fin is supported by slots 22. Also, because the center of gravity of each fin 14 when folded is disposed radially inward with respect to the pivot point of each screw S, the acceleration forces tend to hold the fins 14 against the body 10.

As the projectile travels through the gun tube, leaving the cartridge case 16 behind, there is no tendency for fins 14 to deploy and destructively engage the inside surface of the gun tube.

Figure 2:
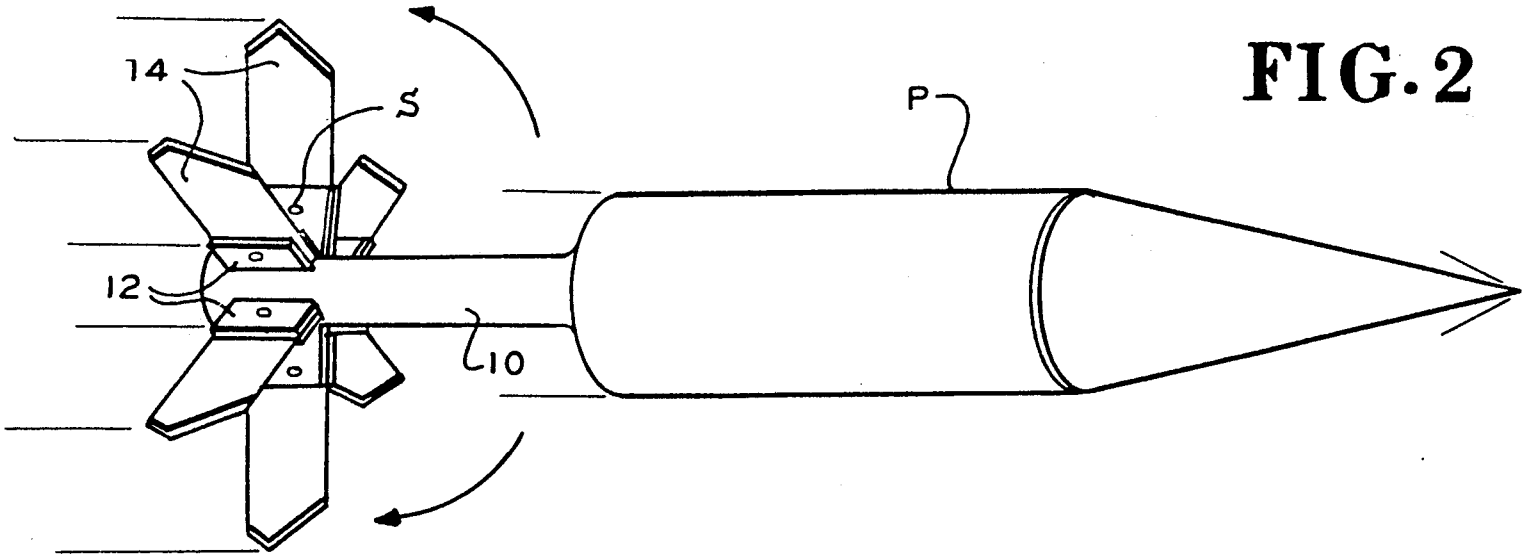
FIG. 2 shows the fin assembly and projectile of FIG. 1 while in flight.

Once the projectile P leaves the gun muzzle (not shown) air turbulence naturally bears on fins 14 driving them outwardly as shown in FIG. 2. Thus fins 14 rotate about screws S until butt 44 (FIG. 5) comes into contact with body 10, at which time fins 14 can no longer rotate and then stay deployed with their lengths approximately perpendicular to the length of body 10.

Fins 14 are installed with the bevel on their leading edge 36 facing in a counterclockwise direction to cause clockwise rotation (when viewed from the rear). Thus as the projectile with its fins extended as shown in FIG. 2 travels, the aerodynamic effect of the bevel spins projectile P. Such spinning insures any weight asymmetries are balanced by the spinning phenomenon.

It is to be appreciated that various modifications may be implemented with respect to the above described preferred embodiments. For example, the fins 14 can be reshaped so that the sweep can be modified or eliminated. In addition, the angle of the beveling can be altered depending upon aerodynamic considerations. While the tabs supporting the fins are shown aerodynamically beveled, in other embodiments such beveling may be altered or eliminated. In addition, the shape of the body can be altered to match the amount of sweeping designed into the corresponding fin. While a threaded front end is shown, the body may have alternate means of connecting to the projectile. Furthermore, the type of projectile can be varied and include various pay loads. In addition, the number and placement of fins can be changed, depending upon aerodynamic considerations. Also, the fins can deploy by turning through an angle other than 90 degrees and if an angle greater than 90 degrees is employed, this feature may cause the leading edge of the fin to be effectively swept back. In such an embodiment or others embodiments, the mid portions of the leading and trailing edges need not be parallel. Also, the body supporting the fins can be fabricated from a plurality of discrete elements or can be machined from unitary cylindrical stock.

Figure 8:
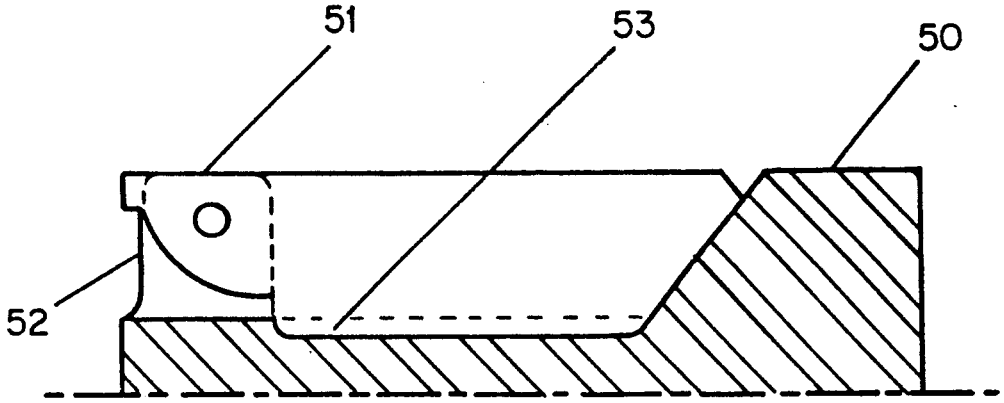
FIGS. 8–11 illustrate additional modifications of the invention where a fin retention groove is formed in a fin hub of a projectile body
Figure 9:
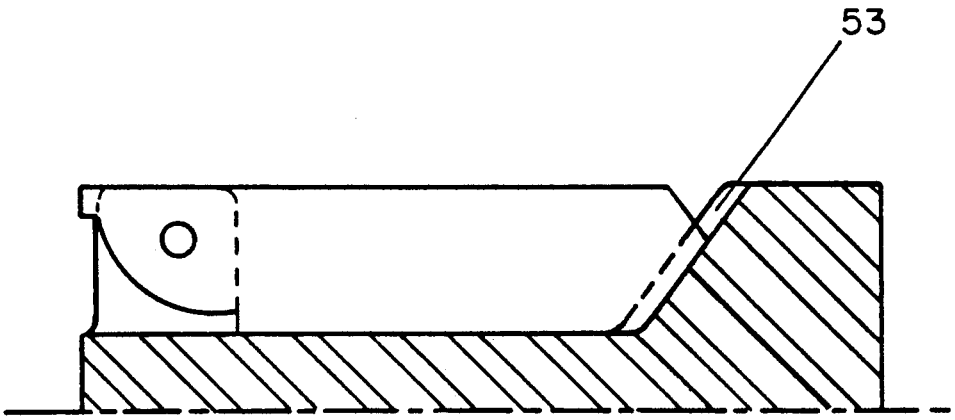
Figure 10:
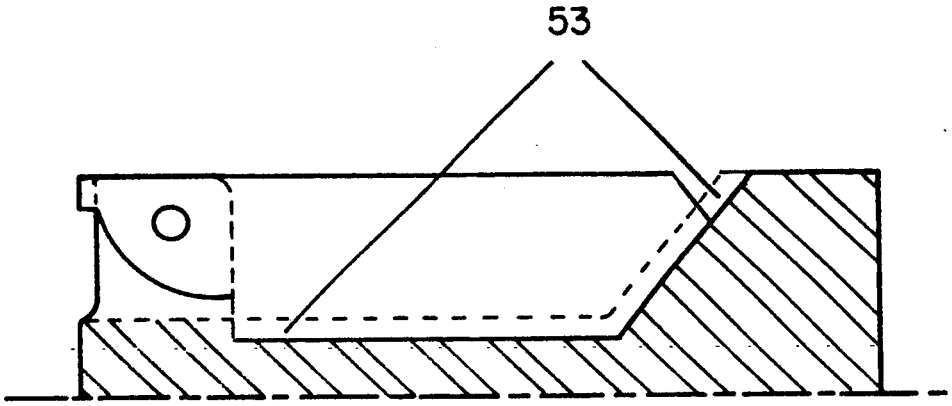
Figure 11:
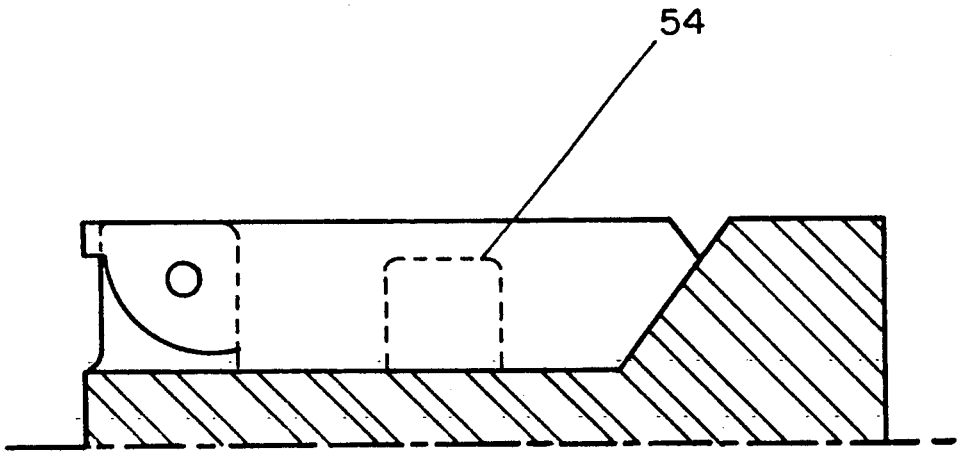
FIG. 11 (PRIOR ART)

FIGS. 8, 9 and 10 are various modifications illustrating the general invention. In each of these, a fin retention groove is formed in a fin hub of the projectile body. FIG. 11 shows a believed prior art practice which includes lateral retention tabs which extend radially on opposite sides of the fin in its initial folded position. The Figures show how a fin 51, can fold along a fin mount 52, for retention into fin grooves 53, in a fin hub 50 (part of the body of a projectile). In FIG. 11, a tab arrangement is used for fin retention.

Obviously, many modifications and variations of the present invention are possible in light of the above teachings. It is therefore to be understood that within the spirit and scope of the disclosure, the invention may be practiced otherwise than as specifically described, and also includes therein all substitutions, modifications or variations as may occur to one skilled in this art.

What is claimed is:

1. In a fin assembly adapted for rear mounting on a projectile, said fin assembly comprising a body having a fin hub, which said body has a longitudinal axis and a front adapted for mounting to the projectile and a plurality of angularly spaced fins pivotally mounted on said body for rotating outwardly form an axial to an extended position, each of said fins having a pivot point and a center of gravity, the center gravity for each fin in the axial position being spaced radially inward from said pivot point, said body adapted to at least partially receive and retain each of said fins when in said axial position.

2. A fin assembly according to claim 1 wherein said body includes:

an axisymmetric midsection with said fin hub having a flared front section.

3. A fin assembly according to claim 1, wherein said fin hub has a generally cylindrical midsection.

* * * * *